United States Patent
Oteri et al.

(10) Patent No.: US 12,438,678 B2
(45) Date of Patent: Oct. 7, 2025

(54) SYSTEM AND METHODS FOR PDCCH MONITORING IN NEW RADIO

(71) Applicant: Apple Inc., Cupertino, CA (US)

(72) Inventors: Oghenekome Oteri, Cupertino, CA (US); Chunhai Yao, Cupertino, CA (US); Chunxuan Ye, Cupertino, CA (US); Dawei Zhang, Cupertino, CA (US); Haitong Sun, Cupertino, CA (US); Hong He, Cupertino, CA (US); Sigen Ye, Cupertino, CA (US); Wei Zeng, Cupertino, CA (US); Weidong Yang, Cupertino, CA (US); Yushu Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,227

(22) PCT Filed: Aug. 5, 2020

(86) PCT No.: PCT/CN2020/107239
§ 371 (c)(1),
(2) Date: Sep. 24, 2021

(87) PCT Pub. No.: WO2022/027384
PCT Pub. Date: Feb. 10, 2022

(65) Prior Publication Data
US 2023/0155794 A1    May 18, 2023

(51) Int. Cl.
*H04L 5/00* (2006.01)
*H04L 1/00* (2006.01)

(52) U.S. Cl.
CPC .......... *H04L 5/0064* (2013.01); *H04L 1/0038* (2013.01); *H04L 5/001* (2013.01); *H04L 5/0053* (2013.01); *H04L 5/0083* (2013.01)

(58) Field of Classification Search
CPC ..... H04L 5/0058; H04L 5/0064; H04L 5/001; H04L 5/0053; H04L 5/0078;
(Continued)

(56) References Cited

U.S. PATENT DOCUMENTS

| | | | | |
|---|---|---|---|---|
| 2016/0157082 A1* | 6/2016 | Chae | ...................... | H04L 5/0048 370/328 |
| 2018/0070192 A1* | 3/2018 | Lee | ...................... | H04L 27/2626 |

(Continued)

FOREIGN PATENT DOCUMENTS

| | | | | |
|---|---|---|---|---|
| CA | 3029821 A1 * | 12/2018 | ........... | H04B 7/2656 |
| CN | 110474737 A | 11/2019 | | |

(Continued)

OTHER PUBLICATIONS

CN Office Action, including Search Report received for Chinese Patent Application No. 202080103216.4, mailed on May 31, 2024, 14 pages (6 pages of English Translation and 8 pages of Original Document).

(Continued)

*Primary Examiner* — Kouroush Mohebbi
(74) *Attorney, Agent, or Firm* — Kubota & Basol LLP

(57) ABSTRACT

A method and apparatus for determining a physical downlink control channel (PDCCH) search space monitoring configuration for a wireless device that specifies PDCCH monitoring for one subcarrier spacing (SCS) selected from a group of subcarrier spacings (SCSs) that are related to a spectrum in 5G new radio (NR) above 52.6 GHz are described. In one embodiment, the monitoring limits associated with each of the SCSs are applied per slot per CC and the user equipment (UE) decode complexity associated with performing the monitoring limits for the different SCSs in the group is equal. In one embodiment, the monitoring limits associated with each of the SCSs are for a slot group of a (Continued)

---

Receive monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, and wherein monitoring limits associated with each of the SCSs, including a number of blind decodes (BD) and a number of CCEs per component carrier (CC), are applied per slot per CC and UE decode complexity associated with performing the monitoring limits for the different SCSs in the group is equal
1801

↓

Configure the UE to perform monitoring of each search space according to the monitoring configuration information, including PDCCH search space monitoring as specified in the monitoring configuration information
1802

↓

Perform dropping of one or both candidates that require blind decoding or candidates that require channel estimations in response to exceeding the monitoring limits
1803 plurality of slots and are for application over a duration of the slot group.

18 Claims, 15 Drawing Sheets

(58) Field of Classification Search
CPC ... H04L 5/0082; H04L 5/0083; H04L 5/0085; H04L 5/0087; H04L 1/0036; H04L 1/0038
See application file for complete search history.

(56) References Cited

U.S. PATENT DOCUMENTS

| | | | |
|---|---|---|---|
| 2019/0052503 A1* | 2/2019 | Hayashi | H04L 5/0092 |
| 2019/0104510 A1* | 4/2019 | Lee | H04W 72/12 |
| 2019/0110279 A1 | 4/2019 | Behravan et al. | |
| 2019/0150073 A1* | 5/2019 | Tiirola | H04W 72/044 455/434 |
| 2019/0208507 A1* | 7/2019 | Xiong | H04L 69/324 |
| 2019/0223164 A1 | 7/2019 | He et al. | |
| 2019/0253308 A1* | 8/2019 | Huang | H04L 43/0823 |
| 2019/0261422 A1* | 8/2019 | Islam | H04L 27/2666 |
| 2019/0387546 A1* | 12/2019 | Li | H04L 27/26132 |
| 2020/0154449 A1* | 5/2020 | Akkarakaran | H04W 72/56 |
| 2020/0154467 A1* | 5/2020 | Gong | H04W 76/27 |
| 2020/0205020 A1* | 6/2020 | Nam | H04W 48/12 |
| 2020/0329389 A1* | 10/2020 | Hosseini | H04W 72/23 |
| 2020/0374806 A1* | 11/2020 | Manolakos | H04W 52/325 |
| 2020/0382978 A1* | 12/2020 | Manolakos | H04B 17/309 |
| 2021/0014900 A1* | 1/2021 | Lei | H04W 52/42 |
| 2021/0037502 A1* | 2/2021 | Tsai | H04L 5/0053 |
| 2021/0058189 A1 | 2/2021 | Xiao et al. | |
| 2021/0127285 A1* | 4/2021 | Khoshnevisan | H04L 5/001 |
| 2021/0144745 A1* | 5/2021 | Yang | H04L 5/0044 |
| 2021/0266979 A1* | 8/2021 | Zewail | H04L 5/0007 |

FOREIGN PATENT DOCUMENTS

| | | | | |
|---|---|---|---|---|
| CN | 110830216 A | | 2/2020 | |
| EP | 3675576 A1 * | | 7/2020 | H04L 5/001 |
| WO | 2018/204886 A1 | | 11/2018 | |
| WO | WO-2019239318 A1 * | | 12/2019 | H04B 17/0085 |
| WO | 2020/029945 A1 | | 2/2020 | |
| WO | WO-2020032868 A1 * | | 2/2020 | H04L 5/0053 |
| WO | WO-2020033652 A1 * | | 2/2020 | H04B 17/18 |
| WO | 2020/072963 A1 | | 4/2020 | |
| WO | 2020/146848 A1 | | 7/2020 | |

OTHER PUBLICATIONS

Huawei, et al., "Corrections on bandwidth part and CA", 3GPP TSG RAN WG1 Meeting #94bis, Chengdu, China, R1-1810112, Oct. 8-12, 2018, 14 pages.
International Preliminary Report on Patentability received for PCT Patent Application No. PCT/CN2020/107239, mailed on Feb. 16, 2023, 5 pages.
International Search Report and Written Opinion received for PCT Patent Application No. PCT/CN2020/107239, mailed on Apr. 25, 2021, 6 pages.
Nokia et al., "Remaining details on search space", 3GPP TSG RAN WG1 Meeting 91, Reno, USA, R1-1720507, Nov. 27-Dec. 1, 2017, 10 pages.
NTT Docomo, et al., "Search space", 3GPP TSG RAN WG1 Meeting #92bis, Sanya, China, R1-1805048, Apr. 16-20, 2018, pp. 1-12.
NTTdocomo, Inc., "Search space", 3GPP TSG RAN WG1 Meeting #92, Athens, Greece, R1-1802480, Feb. 26-Mar. 2, 2018, pp. 1-17.
Samsung, "Cross-carrier Scheduling with Different Numerologies", 3GPP TSG RAN WG1 #96bis, Xi'an, China, R1-1904399, Apr. 8-12, 2019, pp. 1-5.
Supplementary European Search Report and Search Opinion received for European Application No. 20948658.8, mailed on Apr. 19, 2024, 19 pages.
Extended European Search Report received for European Application No. 20948658, mailed on Jul. 10, 2024, 15 pages.
CN Office Action, including Search Report received for Chinese Patent Application No. 202080103216.4, mailed on Nov. 22, 2024, 16 pages (8 pages of English Translation and 8 pages of Original Document).

* cited by examiner

| μ | Max # of monitored PDCCH candidate per slot per CC |
|---|---|
| 0 | 44 |
| 1 | 36 |
| 2 | 22 |
| 3 | 20 |

| μ | Max # of non-overlapped CCEs per slot per CC |
|---|---|
| 0 | 56 |
| 1 | 56 |
| 2 | 48 |
| 3 | 32 |

| | Maximum number $M^{max,(X,Y),\mu}_{PDCCH}$ of monitored PDCCH candidates per span for combination (X, Y) and per serving cell | | |
|---|---|---|---|
| $\mu$ | (2,2) | (4,3) | (7,3) |
| 0 | 14 | 28 | 44 |
| 1 | 12 | 24 | 36 |

FIG. 9A

| | Maximum number $M^{max,(X,Y),\mu}_{PDCCH}$ of non-overlapped CCEs per span for combination (X, Y) and per serving cell | | |
|---|---|---|---|
| $\mu$ | (2,2) | (4,3) | (7,3) |
| 0 | 18 | 36 | 56 |
| 1 | 18 | 36 | 56 |

FIG. 9B

| | Max # of monitored PDCCH candidate per slot per CC | |
|---|---|---|
| | Option 1 | Option 2 (2x) |
| 3 (120 kHz) | 20 | 40 |
| 4 (240 kHz) | 20 | 20 |
| 5 (480 kHz) | 20 | 10 |
| 6 (960 kHz) | 20 | 5 |

| | Max # of non-overlapped CCEs per slot per CC | |
|---|---|---|
| | Option 1 | Option 2 (2x) |
| 3 (120 kHz) | 32 | |
| 4 (240 kHz) | 32 | 32 |
| 5 (480 kHz) | 32 | 16 |
| 6 (960 kHz) | 32 | 8 |

Receive monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, and wherein monitoring limits associated with each of the SCSs, including a number of blind decodes (BD) and a number of CCEs per component carrier (CC), are applied per slot per CC and UE decode complexity associated with performing the monitoring limits for the different SCSs in the group is equal
1801

Configure the UE to perform monitoring of each search space according to the monitoring configuration information, including PDCCH search space monitoring as specified in the monitoring configuration information
1802

Perform dropping of one or both candidates that require blind decoding or candidates that require channel estimations in response to exceeding the monitoring limits
1803

FIG. 18

Receive monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, and wherein monitoring limits are associated with each of the SCSs including a number of blind decodes (BD) and a number of CCEs per component carrier (CC) for a slot group of a plurality of slots and for application over a duration of the slot group
1901

Configure the UE to perform monitoring of each search space according to the monitoring configuration information, including PDCCH search space monitoring as specified in the monitoring configuration information
1902

Perform dropping of one or both candidates that require blind decoding or candidates that require channel estimations in response to exceeding the monitoring limits
1903

FIG. 19

Determine a physical downlink control channel (PDCCH) search space monitoring configuration for a wireless device, wherein the PDCCH search space monitoring configuration specifies PDCCH monitoring for one subcarrier spacing (SCS) selected from a group of subcarrier spacings (SCSs) that are related to a spectrum in 5G new radio (NR) above 52.6 GHz, and wherein monitoring limits associated with each of the SCSs, including a number of blind decodes (BD) and a number of CCEs per component carrier (CC), are applied per slot per CC and wireless device (e.g., UE) decode complexity associated with performing the monitoring limits for the different SCSs in the group is equal
2001

Transmit monitoring configuration information identifying the monitoring configuration to the wireless device
2002

FIG. 20

```
┌─────────────────────────────────────────────────────────────────────┐
│  Determine a physical downlink control channel (PDCCH) search space monitoring │
│    configuration for a wireless device, wherein the PDCCH search space monitoring │
│  configuration specifies PDCCH monitoring for one subcarrier spacing (SCS) selected │
│   from a group of subcarrier spacings (SCSs) that are related to a spectrum in 5G new │
│    radio (NR) above 52.6 GHz, and wherein monitoring limits are associated with each of │
│        the SCSs including a number of blind decodes (BD) and a number of CCEs per │
│   component carrier (CC) for a slot group of a plurality of slots and for application over a │
│                         duration of the slot group │
│                                 2101 │
└─────────────────────────────────────────────────────────────────────┘
                                    │
                                    ▼
┌─────────────────────────────────────────────────────────────────────┐
│   Transmit monitoring configuration information identifying the monitoring │
│              configuration to the wireless device │
│                                 2102 │
└─────────────────────────────────────────────────────────────────────┘
```

FIG. 21

SYSTEM AND METHODS FOR PDCCH MONITORING IN NEW RADIO

RELATED APPLICATIONS

The present application is the national phase of International Application No. PCT/CN2020/107239, filed on Aug. 5, 2020 and the disclosure of which is hereby incorporated herein by reference in its entirety.

FIELD OF INVENTION

This invention relates generally to wireless technology and more particularly to PDCCH monitoring by user equipment (UE) in new radio (NR).

BACKGROUND OF THE INVENTION

Fifth generation mobile network (5G) is a wireless standard that aims to improve upon data transmission speed, reliability, availability, and more. This standard, while still developing, includes numerous details relating to various aspects of wireless communication, for example, NR and NR in a spectrum greater than 52.6 GHz.

SUMMARY OF THE DESCRIPTION

Methods and apparatuses for performing PDCCH monitoring are described. Aspects of the present disclosure relate to 5G NR and 5G NR operating in a spectrum above the 52.6 gHz band. In some embodiment, a method for use by a user equipment comprises: receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, wherein monitoring limits are associated with each of the SCSs including a number of blind decodes (BD) and a number of CCEs per component carrier (CC) for a slot group of a plurality of slots and for application over a duration of the slot group; and monitoring each search space according to the monitoring configuration information.

In some embodiments, a UE comprises one or more processors configured to perform the operations comprising: receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, wherein monitoring limits are associated with each of the SCSs including a number of blind decodes (BD) and a number of CCEs per component carrier (CC) for a slot group of a plurality of slots and for application over a duration of the slot group; and monitoring each search space according to the monitoring configuration information.

In some embodiments, one or more non-transitory computer readable storage media having instructions stored therein which, when executed by one or more processors of network equipment, cause the UE to perform the operations comprising: receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, wherein monitoring limits are associated with each of the SCSs including a number of blind decodes (BD) and a number of CCEs per component carrier (CC) for a slot group of a plurality of slots and for application over a duration of the slot group; and monitoring each search space according to the monitoring configuration information.

In some embodiments, the baseband processor configured to perform the operations comprising: receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, wherein monitoring limits are associated with each of the SCSs including a number of blind decodes (BD) and a number of CCEs per component carrier (CC) for a slot group of a plurality of slots and for application over a duration of the slot group; and monitoring each search space according to the monitoring configuration information. BRIEF DESCRIPTION OF THE DRAWINGS The present invention is illustrated by way of example and not limitation in the figures of the accompanying drawings in which like references indicate similar elements.

FIGS. 9A and 9B illustrate the maximum number of monitored PDCCH candidates per slot per CC and a maximum number of non-overlapped CCEs (and their associated channel estimations) per slot per CC.

FIG. 18 is a flow diagram of one embodiment of a process for configuring a UE.

FIG. 19 is a flow diagram of another embodiment of a process for configuring a UE.

FIG. 20 is a flow diagram of one embodiment of a process by which network equipment configures a UE.

FIG. 21 is a flow diagram of another embodiment of a process by which network equipment configures a UE.

DETAILED DESCRIPTION

Figure 1:
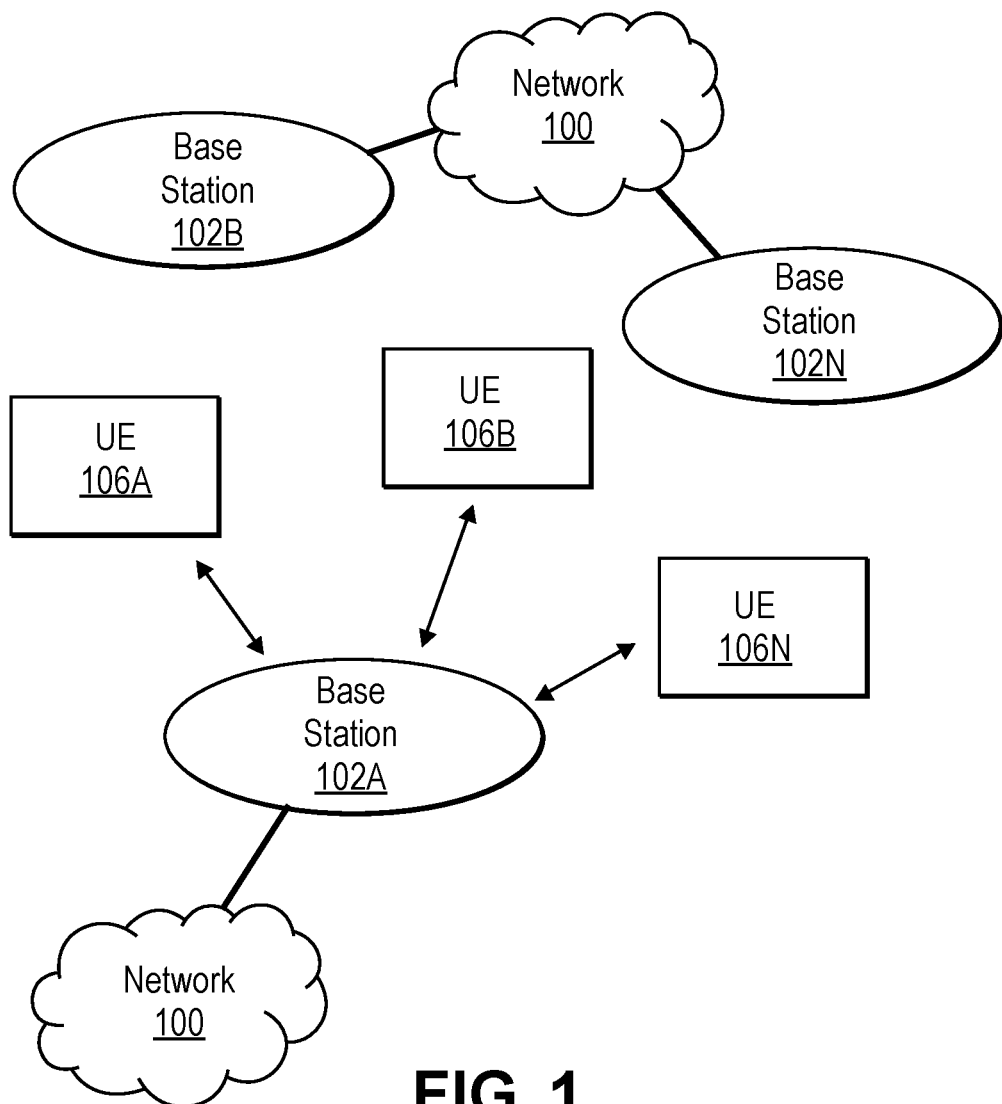
FIG. 1 illustrates an example wireless communication system according to some embodiments.

A method and apparatus for determining a physical downlink control channel (PDCCH) search space monitoring configuration for a wireless device that specifies PDCCH monitoring for one subcarrier spacing (SCS) selected from a group of subcarrier spacings (SCSs) that are related to a spectrum in 5G new radio (NR) above 52.6 GHz are described. In one embodiment, the monitoring limits associated with each of the SCSs, including a number of blind decodes (BD) and a number of CCEs per component carrier (CC), are applied per slot per CC and the user equipment (UE) decode complexity associated with performing the monitoring limits for the different SCSs in the group is equal. In one embodiment, the monitoring limits for the SCSs are scaled versions of each other and increase based on reduction in symbol size (i.e. increase in subcarrier spacing). In one embodiment, the monitoring limits associated with each of the SCSs are for a slot group of a plurality of slots and are for application over a duration of the slot group.

It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a physical downlink control channel (PDCCH) search space monitoring configuration for a wireless device that specifies PDCCH monitoring for one subcarrier spacing (SCS) selected from a group of subcarrier spacings (SCSs) that are related to a spectrum in 5G new radio (NR) above 52.6 GHz are described. In one embodiment, the monitoring limits associated with each of the SCSs, including a number of blind decodes (BD) and a number of CCEs per component carrier (CC), are applied per slot per CC and the user equipment (UE) decode complexity associated with performing the monitoring limits for the different SCSs in the group is equal. In one embodiment, the monitoring limits for the SCSs are scaled versions of each other and increase based on reduction in symbol size. In one embodiment, the monitoring limits associated with each of the SCSs are for a slot group of a plurality of slots and are for application over a duration of the slot group.

The frequency bands for 5G networks come in two sets-frequency range 1 (FR1) and frequency range 2 (FR2). FR1 covers communications from 450 MHz to 6 GHz, which includes the LTE frequency range. FR2 covers 24.25 GHz to 52.6 GHz. FR2 is known as the millimeter wave (mmWave) spectrum. In some embodiments, the UE and base station can communicate over NR in the unlicensed band which is above FR2, also known as NR-U.

In some embodiments, 5G NR operates in a spectrum above the 52.6 gHz band (e.g., frequencies greater than 52.6 GHz, such as, for example, between 52.6 GHz and 71 GHz) into 5G networks. Radio waves in this band have wavelengths in the so-called millimeter band, and radiation in this band is known as millimeter waves. When operating at these frequencies, 5G NR enables both uplink and downlink operation in unlicensed and/or licensed bands and supports features, such as, for example, but not limited to, wideband carriers, flexible numerologies, dynamic TDD, beamforming, and dynamic scheduling/HARQ timing.

It should be understood that aspects described in the present disclosure with reference to NR can also apply to NR in a spectrum above the 52.6 GHz band unless context dictates otherwise.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
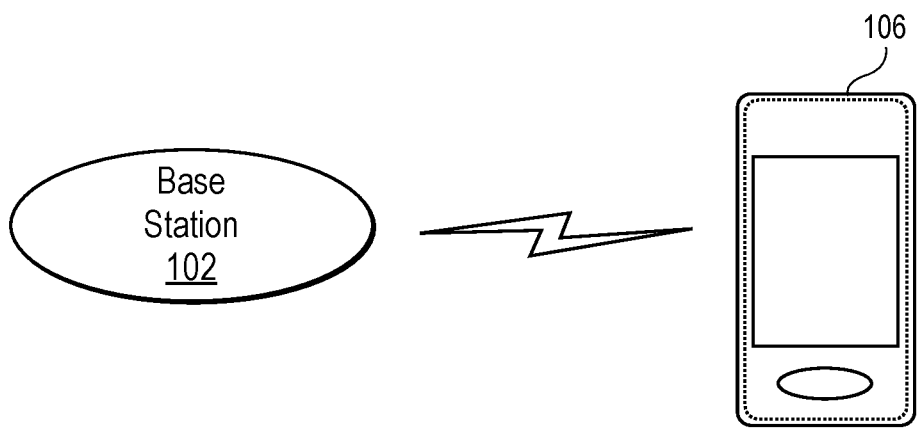
FIG. 2 illustrates uplink and downlink communications according to some embodiments.

FIG. 2 illustrates UE 106A that can be in communication with a base station 102 through uplink and downlink communications, according to some embodiments. The UEs may each be a device with cellular communication capability such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE may include one or more antennas for communicating using one or more wireless communication protocols or technologies. In some embodiments, the UE may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE may include separate transmit and/or receive chains (e.g., including separate antennas and other radio components) for each wireless communication protocol with which it is configured to communicate. As a further possibility, the UE may include one or more radios which are shared between multiple wireless communication protocols, and one or more radios which are used exclusively by a single wireless communication protocol. For example, the UE might include a shared radio for communicating using either of LTE or 5G NR (or LTE or 1×RTTor LTE or GSM), and separate radios for communicating using each of Wi-Fi and Bluetooth. Other configurations are also possible.

In some embodiments, the UE and base station can communicate over NR in the unlicensed band, also known as NR-U. NR-U is a mode of operation included in NR Release 16 that defines technology for cellular operators to integrate the unlicensed spectrum (e.g., frequencies greater than or equal to 52 GHz, or between 52.6 GHz and 71 GHz) into 5G networks. Radio waves in this band have wavelengths in the so-called millimeter band, and radiation in this band is known as millimeter waves. NR-U enables both uplink and downlink operation in unlicensed bands. NR-U supports new features, for example, wideband carriers, flexible numerologies, dynamic TDD, beamforming, and dynamic scheduling/HARQ timing. Problems exist, however, regarding dynamic scheduling, as are discussed in other sections.

Figure 3:
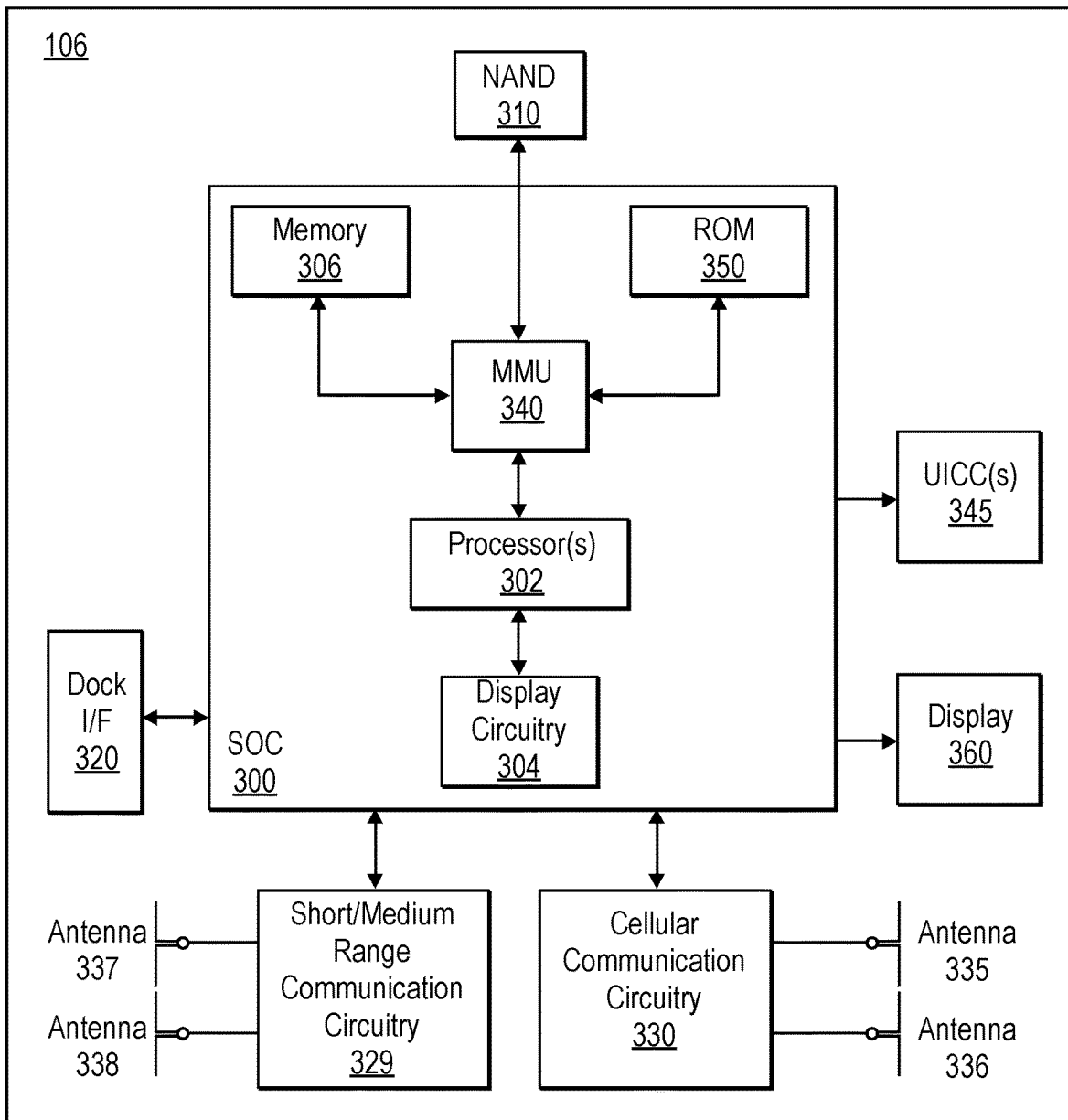
FIG. 3 illustrates an example block diagram of a UE according to some embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a UE device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to provide PDCCH monitoring and its associated configuration for a user equipment device and a base station.

As described herein, the communication device 106 may include hardware and software components for implementing the above features for performing PDCCH monitoring for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
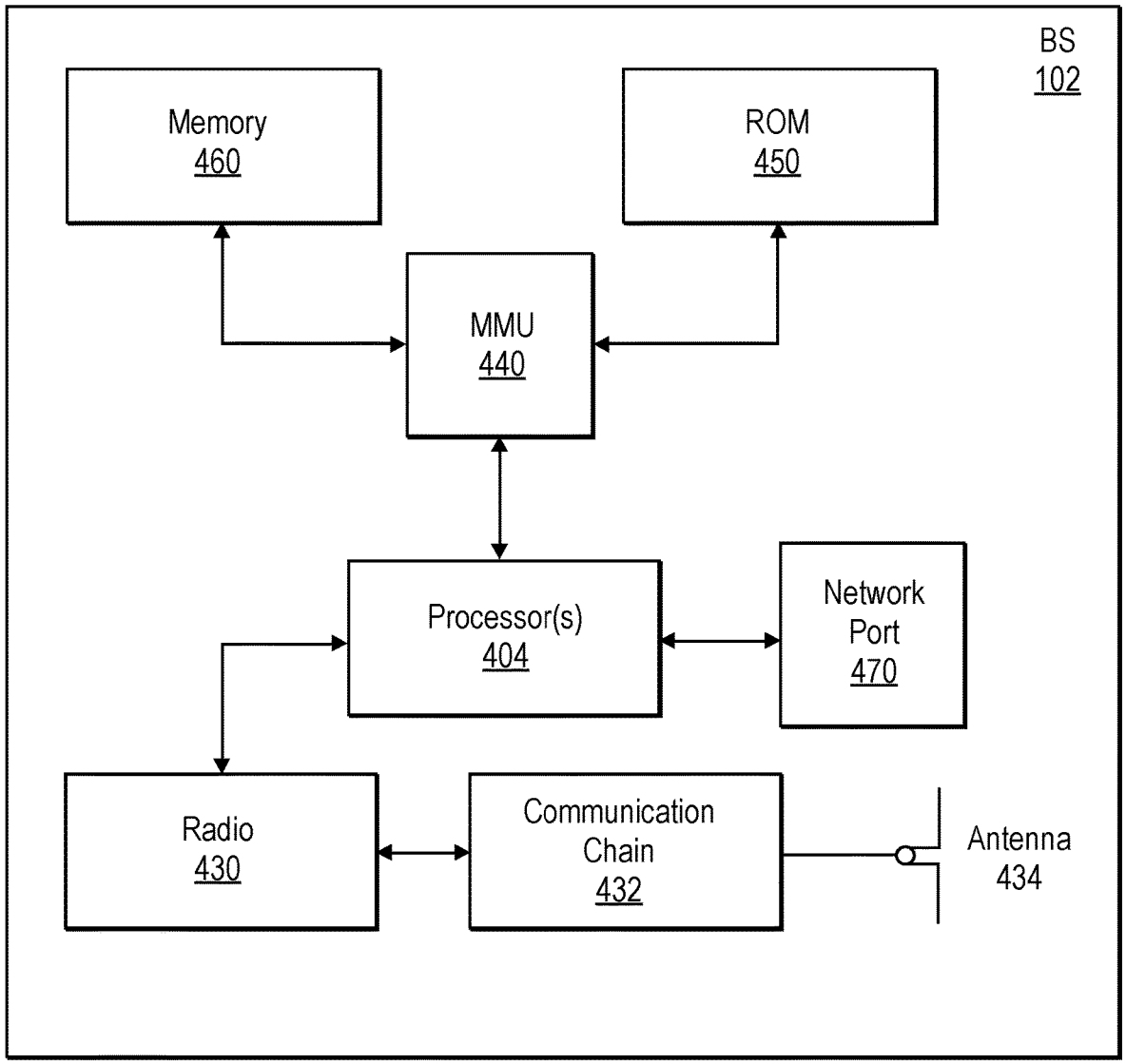
FIG. 4 illustrates an example block diagram of a BS according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs. In some embodiments, the base station can operate in 5G NR-U mode or in a mode that operates in a spectrum above the 52.6 gHz band The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, 5G NR-U, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR and 5G NR-U. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
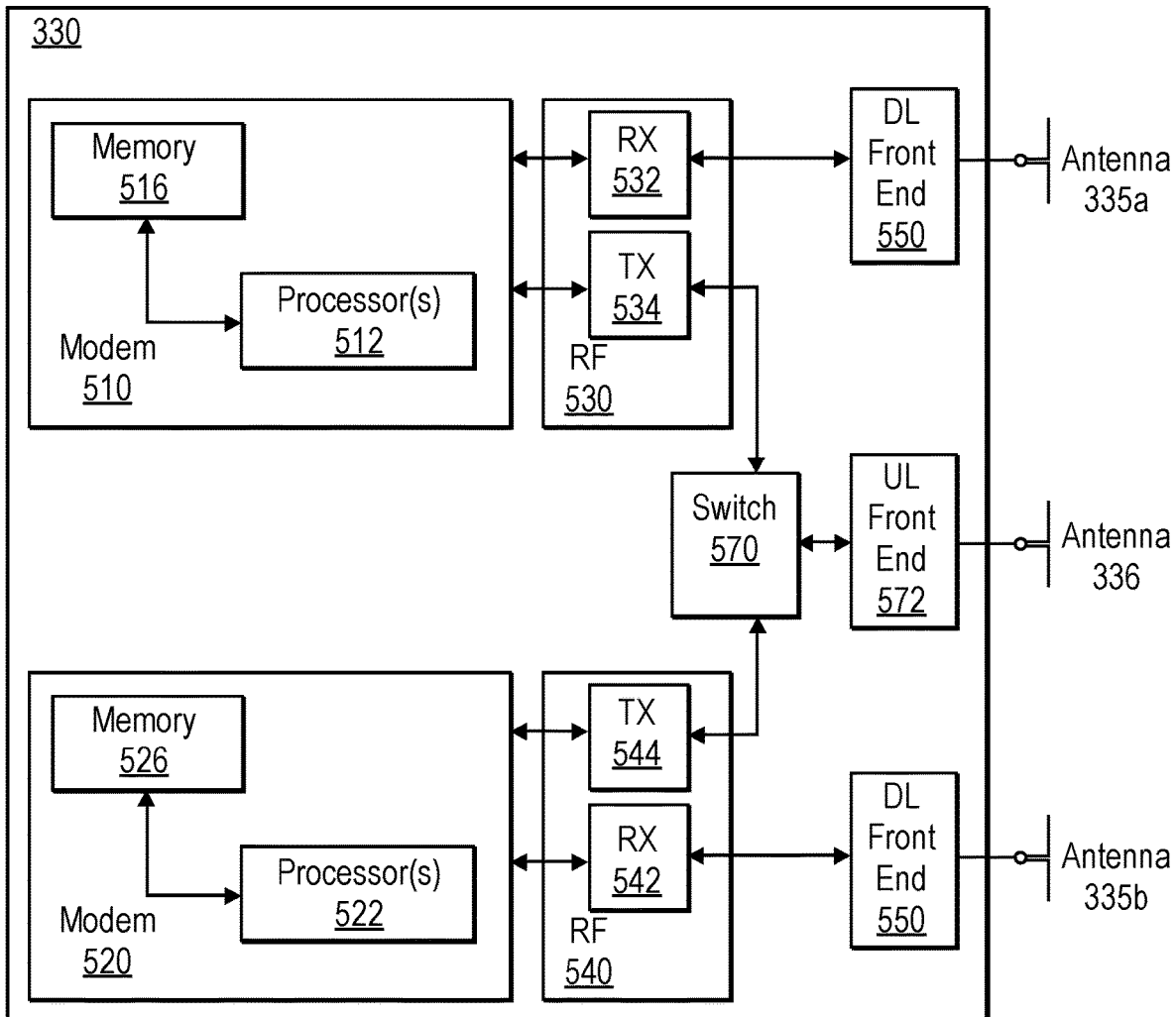
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for determining a physical downlink shared channel scheduling resource for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for determining a physical downlink shared channel scheduling resource for a user equipment device and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

In one embodiment, PDCCH monitoring is performed by the UE to obtain downlink control information (DCI) to provide the UE with information regarding uplink and/or downlink transmission. This information includes, for example, but not limited to, physical layer resource allocation, power control commands, HARQ information for both uplink and downlink, and other information to facilitate uplink and downlink transmission. In one embodiment, the PDCCH monitoring is symbol-level monitoring.

Figure 6:
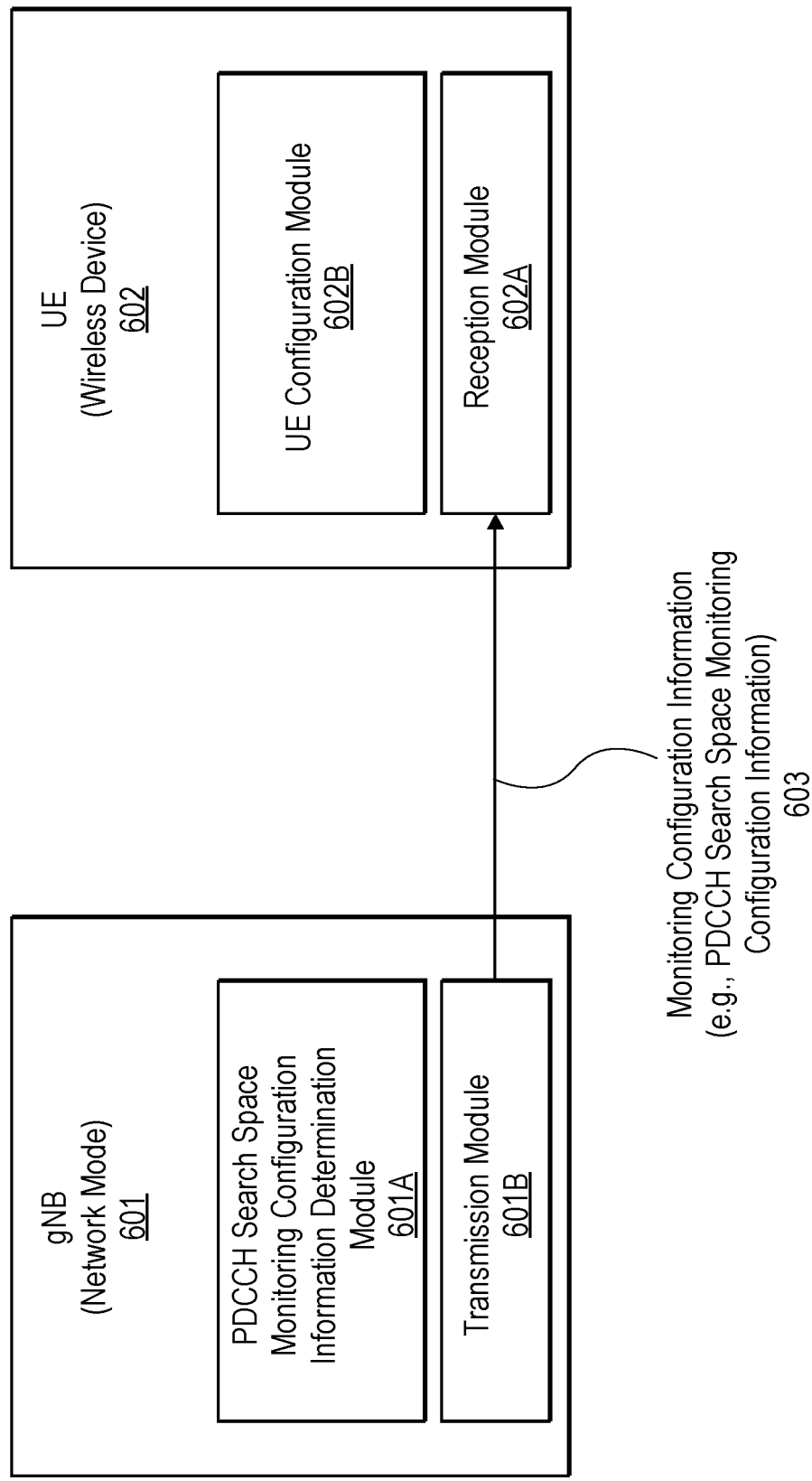
FIG. 6 is a data flow diagram of one embodiment of a configuration process for configuring a wireless device.

FIG. 6 is a data flow diagram of one embodiment of a configuration process for configuring a wireless device. Referring to FIG. 6, a gNB (or other network node) 601 includes a determination module 601A to determine a PDCCH search space monitoring configuration for a UE (or other wireless device), such as, for example, UE 602 and generates configuration information to configure a UE to perform PDCCH search space monitoring according to the PDCCH search space monitoring configuration. A transmission module 601B transmits monitoring configuration information 603 (e.g., configuration information for configuring a wireless device to perform PDCCH search space monitoring).

UE 602 includes a reception module 602A to receive monitoring configuration information 603 and a UE configuration module 602B to configure UE 602 based on monitoring configuration information 603. In such a case, UE configuration module 602B performs the necessary decoding and processing of the monitoring configuration information 603 to obtain information that is used to configure UE 602, including information to enable the UE to perform the functions related to PDCCH monitoring.

The UE may be configured to perform PDCCH monitoring on the first 3 OFDM symbols of a slot. This is referred to herein as configuration 1-1 herein. In another embodiment, the UE may be configured to perform PDCCH monitoring of 3 consecutive OFDM symbols of a slot. This is referred to herein as configuration 1-2 herein. In this configuration, the UE capability signaling indicates whether the UE supports receiving PDCCH scrambled with C-RNTI or CS-RNTI in a search space configured to be monitored within a single span of any three contiguous OFDM symbols in a slot, and this configuration is only used for one frequency range (e.g., frequency range 1 (FR1) of 5G NR).

In yet another UE configuration, referred to as use configuration 2, UE may be configured to perform PDCCH monitoring that monitors occasions for type1 common search space (CSS) with dedicated radio resource control (RRC) configuration, type3 CSS, and the UE-search space (UE-SS) on any OFDM symbols of a slot. In one use, this is an optional feature with UE capability signaling to indicate one of two options: 1) where there is no gap between two DCIs, or the ith minimum time separation between two unicast DCIs: 2 symbols/15 KHz, 4 symbols/30 KHz, 7 symbols/60 KHz NCP, and 12 symbols/120 KHz.

Figures 7, 8A, 8B:
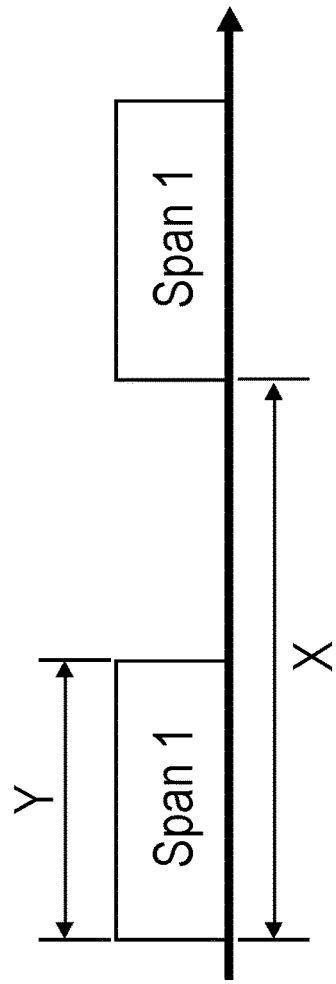
FIG. 7 illustrates an example of a span gap where X represents the distance, in terms of symbols, between spans and Y represents the length of a span, in terms of symbols.
FIGS. 8A and 8B illustrate the maximum number of monitored PDCCH candidates per slot per CC and a maximum number of non-overlapped CCEs (and their associated channel estimations) per slot per CC.

In yet another configuration, the UE performs PDCCH monitoring for monitoring occasions, and this monitoring can be any OFDM symbols of a slot for use configuration 2 with a span gap. FIG. 7 illustrates an example of a span gap where X represents the distance, in terms of symbols, between spans and Y represents the length of a span, in terms of symbols. In a configuration previously defined in NR, the PDCCH monitoring configuration information indicates whether the UE supports PDCCH search space monitoring occasions in any symbol of the slot with a minimum time separation between two consecutive transmissions of PDCCH and with a span up to two OFDM symbols for two OFDM symbols or a span up to three OFDM symbols for four and seven OFDM symbols. In one configuration, the supported value set (X,Y) is (7,3). In another configuration, the supported value sets of (X,Y) include (4,3) and (7,3). In yet another configuration, the supported value sets of (X,Y) are (2,2), (4,3) and (7,3).

In one configuration, for the set of monitoring occasions that are within the same span, there is 1 downlink (DL) DCI+1 uplink (UL) DCI per scheduled CC across this set of monitoring occasions for FDD and 1 DL DCI+up to 2 UL DCI per scheduled CC across this set of monitoring occasions for TDD. Furthermore, the number of different start symbol indices of spans for all PDCCH monitoring occasions per slot, including PDCCH monitoring occasions of configuration 1-1, is no more than floor (14/X), where X is an integer that represents a minimum among values reported by UE. In one configuration, the number of different start symbol indices of PDCCH monitoring occasions per slot including PDCCH monitoring occasions of configuration 1-1, is no more than 7, and the number of different start symbol indices of PDCCH monitoring occasions per half-slot including PDCCH monitoring occasions of configuration 1-1 is no more than 4 in secondary cell (SCell).

As discussed above, the UE is configured with a scheduling complexity that enables it to perform a predefined number of blind decodes of candidates (e.g., a maximum number of monitored PDCCH candidates) and a predefined number of non-overlapped CCEs (and their associated channel estimations) per slot per CC. In one configuration defined in NR release 15, the UE has a Scheduling Complexity Unit equal to 1 slot (i.e., the monitoring limits are per slot per component carrier (CC)), where the scheduling complexity unit is defined as the time duration over which the complexity limits are valid. FIGS. 8A and 8B illustrates the maximum number of monitored PDCCH candidates per slot per CC and a maximum number of non-overlapped CCEs (and their associated channel estimations) per slot per CC. In a case where the monitoring limits are exceeded, the UE has been subjected to overbooking, a dropping algorithm may be used by the UE to perform dropping per slot to cause the UE to stop performing any additional blind decodes and handling of any additional non-overlapped CCEs for the slot.

In a configuration defined in NR release 16, the Scheduling Complexity Unit is equal to 1 span (i.e., the monitoring limits are per span per CC). In this case, the monitoring limits comprises per-CC limit on the maximum number of non-overlapping CCEs per monitoring span and the maximum number of monitored PDCCH candidates per monitoring span for all span configurations. FIGS. 9A and 9B illustrates the maximum number of monitored PDCCH candidates per slot per CC (number of blind decodes) and a maximum number of non-overlapped CCEs (and their associated channel estimations) per slot per CC. In this configuration, the spans are defined in terms of (X,Y) as (2,2), (4,3) or (7,3), as there were for configuration discussed above. These limits are approximately twice span-based monitoring limits of the configuration defined in NR release 15. For example, if normalized over a slot, a span configuration of (7,3) has 2 spans in a slot and the limit is 2*56 (or twice that of the configuration defined in NR release 15). In this case, where the complexity limits are exceeded and the UE has been subjected to overbooking, a dropping algorithm may be used by the UE to perform dropping per span to cause the UE to stop performing any additional blind decodes and handling of any additional non-overlapped CCEs for the span.

In above 52.6 GHz transmission, the subcarrier spacing (SCS) is increased to provide robustness to phase noise. In one embodiment, SCSs that are supported for transmission in the communication system by UEs and gNB (or other network nodes) are a group of SCSs that includes 120, 240, 480, and 960 kHz with 1920 kHz. However, the group of SCSs may be included less than all of these SCSs and may include other SCSs. This increase in subcarrier spacing results in a reduction in the size of the symbol (e.g., OFDM symbol). For example, comparing the 120 kHz SCS with the 960 kHz SCS, there is an 8-fold reduction in the size of the symbol.

The reduction in the size of the symbol causes at least one problem. If the PDCCH monitoring procedure is not changed from that which is used in 5G NR, then a UE may be required to increase its PDCCH processing capabilities. In the previous example, the UE would have to perform up to eight times as much PDCCH processing when comparing 120 kHz with 960 kHz.

Furthermore, due to the small size of symbol, the complexity of the UE to perform PDCCH monitoring is made much more difficult. This is particularly the case if the PDCCH monitoring results in multiple PDCCH monitoring periodicity of less than 14 symbols. This would prevent the use of Feature Group (FG) 3-5, FG 3-5a and FG 3-5b describe above.

In one embodiment, the UE is configured to perform PDCCH monitoring for the SCSs in the group of different subcarrier spacings (SCSs) that are related to a spectrum in 5G new radio (NR) above 52.6 GHz (that includes in one embodiment, for example, 120, 240, 480, and 960 kHz), where PDCCH search space monitoring comprises PDCCH monitoring for one of these subcarrier spacing (SCS) and the monitoring limits associated with each of the SCSs, including a number of blind decodes (BD) and a number of CCEs per component carrier (CC), are applied per slot per CC and UE decode complexity associated with performing the monitoring limits for the different SCSs in the group is equal. That is, the UE decode complexity associated with performing the monitoring limits for the different SCSs in the group is equal in that, even though the value of number of blind decodes (BD) and a number of CCEs per component carrier (CC) changes with a change in the SCS and its associated duration, the overall UE complexity with respect to applying the monitoring limits does not increase in comparison to configurations previously defined in NR. In other words, its stays constant over the same duration. In one embodiment, the overall UE complexity with respect to the application of the monitoring limits is the same as the NR or more.

In one embodiment, the UE decode complexity associated with performing the monitoring limits for the different SCSs in the group is maintained by having the PDCCH monitoring performed by the UE for the SCSs in this group of SCSs be scaled based on the SCS. In other words, the maximum number of monitored candidates per slot per CC (e.g., candidates that require blind decodes (BD)) and the maximum number of non-overlapped CCEs per slot per CC (e.g., the number of CCEs that require channel estimations) are scaled for SCSs of 120, 240, 480, and 960 kHz in comparison to those of subcarrier spacing configuration u equal to 0-2 in FIGS. 8A and 8B.

In one embodiment, the scaling is uniform over all the SCSs. For example, in a configuration, referred to herein a configuration 1-1, in which the PDCCH monitoring is limited to the first three OFDM symbols within a slot, or in another configuration, referred to herein as configuration 1-2, in which the PDCCH monitoring can occur in any span of up to three consecutive OFDM symbols, the monitoring limits with respect to the maximum number of monitored candidates per slot per CC and the maximum number of non-overlapped CCEs per slot per CC for the SCSs of 120, 240, 480, and 960 kHz are all scaled the same. In one embodiment, the monitoring limits with respect to the maximum number of monitored candidates per slot per CC and the maximum number of non-overlapped CCEs per slot per CC for SCSs of 120, 240, 480, 960 kHz are all 20 and 32, respectively. This example is shown in the tables as Option 1 in FIGS. 10A and 10B. Thus, from a scheduling complexity, the scheduling complexity unit keeps the BD and CCE limits per slot per CC the same for all. Note that this requires a large increase in UE complexity.

In another embodiment, using with configurations 1-1 or 1-2 with a new SCS, the scaling changes with the changes in SCS. In one embodiment, the BD (blind decodes) and CCE limits scaled are based on increase in complexity (e.g., 2$x$) and the change in SCS. In one embodiment, the monitoring limits scale two times that of the limits shown in the scaled limits of Option 1 in FIGS. 10A and 10B and is shown as Option 2 in FIGS. 10A and 10B. Again, as with Option 1, the BD and CCE monitoring limits are per slot per CC.

Figures 10A, 10B, 11:
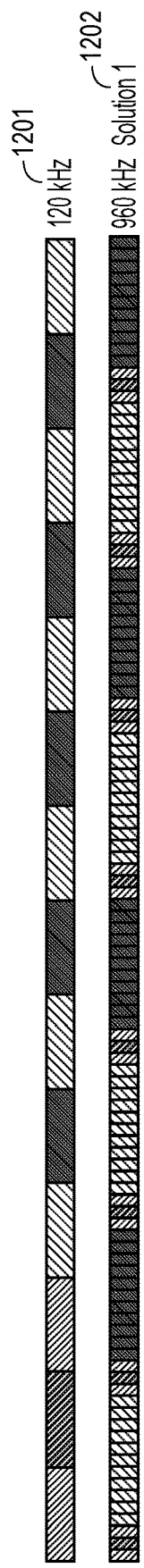
FIGS. 10A and 10B illustrate the maximum number of monitored PDCCH candidates per slot per CC and a maximum number of non-overlapped CCEs (and their associated channel estimations) per slot per CC under options 1 and 2 when scaling PDCCH monitoring with SCS.
FIG. 11 illustrates an example of scaling PDCCH monitoring based on the SCS.

FIG. 11 illustrates an example of scaling PDCCH monitoring based on the SCS. Referring to FIG. 11, OFDM symbols 1101 represents 1 slot at 120 kHz, while OFDM symbols 1102 represents the PDCCH information in the first three symbols of each of the eight slots at 960 kHz. Note that for FIG. 11, as well as FIGS. 12-14, 16 and 17, for the 960 kHz case, each color change is a different slot, while for the 120 kHz case, each color change is a single symbol. Therefore, a yellow slot in the 960 kHz case maps to a symbol in the 120 kHz case.

In another embodiment, in which the UE is configured to perform PDCCH monitoring according to Options 1 or 2, the UE only performs PDCCH monitoring on up to (or over a span of) X symbols, where X is an integer less than or equal to 3 (e.g., 1, 2, 3). Thus, the monitoring occasions (MOs) may be up to three OFDM symbols, thereby reducing the maximum number of symbols allowed to be monitored.

In another embodiment, the UE is configured to perform PDCCH monitoring where the PDCCH monitoring limits are defined over a group of slots (i.e., a slot group). In other words, the scheduling complexity unit extends over a slot group as opposed to one slot or a span as described above such that their duration over which they applied is over the duration of all the slots in the group. This may be referred to herein as slot scheduling complexity aggregation. Therefore, it is not until the limits have been exceeded during the duration of the slot group that the UE stops performing blind decodes per slot per CC and/or handling non-overlapping CCEs per slot per CC.

In some embodiments, the slot group does not set limits on when the action of the DCI occurs. For example, the slot group does not control when the PDSCH is scheduled. Also, in some embodiments, a DCI decoded within a slot group may schedule an action (or multiple actions) outside the slot group. For example, a DCI decoded within a slot group may schedule a single PDSCH or multiple PDSCHs based on cross slot group scheduling. Furthermore, setting up the monitoring limits to extend over a duration of a group of slots allows defining PDCCH complexity over multiple slots while scheduling single or multiple PUSCH/PDSCH instances within (same slot-group scheduling) or across slot groups (cross-slot/cross-slot-group scheduling).

In another embodiment, the UE is configured to perform PDCCH monitoring with limits defined within the slot group to limit the increase in complexity in the UE seen in the uniform scaling PDCCH monitoring configuration described above (in which the BDs and non-overlapping CCE limits are scaled uniformly for SCSs of 120, 240, 480, 960 kHz) and the limitations in complexity per slot seen in SCS-based scaling embodiment (in which the BD and CCE limits are scaled based on SCS) with spreading of the complexity limits over multiple slots. This may be advantageous in scenarios in a beam-based system where some slots may not have any beams. In some embodiments, the complexity limits for that slot may be "used" by another slot within the slot group without increasing the overall complexity load when compared with other configurations previously defined in NR described above.

In one embodiment, these slot group complexity limits are defined based on a reference SCS. For example, in one embodiment, the monitoring limits applied by the UE are set equal to the limits of the reference SCS. For example, assuming the transmitted SCS equals 960 kHz and reference SCS=120 kHz. In this case, the scheduling complexity unit for the transmitted SCS is 8 slots (i.e., the slot group size equals 8) and the BD/CCE limits are defined per slot group per CC and are set to a value based on the limits for the reference SCS, which are the BD/CCE limits associated with the SCE of 120 kHz. Thus, the blind decode (BD) limits for 120 kHz equal 20 and apply to the UE when the transmitted SCS is 960 kHz. Thus, in one embodiment, the BD limits are set to a value (20N, N=1, 2, 3, etc.) and CCE limits are set to a value (32N, N=1, 2, 3, etc.) (e.g., (BD: 20, CCE: 32 if N=1, BD: 40, CCE: 64 if N=2)).

Figure 12:
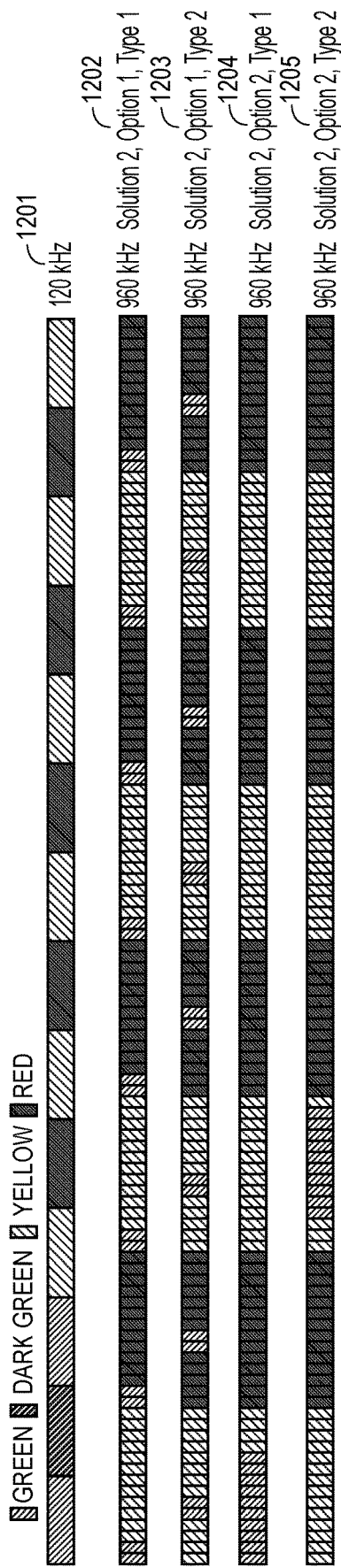
FIG. 12 illustrates an example of PDCCH monitoring occurs within the first X symbols, where X is an integer, for each slot in the slot group.

In one embodiment, the UE is configured with configuring information that specifies slot group PDCCH Monitoring Occasions (MOs). In some embodiment, the information specifies the location of the PDCCH MOs. For example, in one embodiment, the information specifies the location of the PDCCH MOs are defined per slot within the slot group. In another embodiment, the information specifies the location of the PDCCH MOs are defined over the slot group, as opposed to per slot within the slot group. In this case, in one embodiment, for each slot in the slot group, PDCCH monitoring occurs within the first X symbols, where X is an integer. FIG. 12 illustrates an example of this. Referring to FIG. 12, a number of slots are shown in OFDM symbols 1201 for an SCS of 120 kHz, and the information in OFDM symbols 1201 is aggregated into the 8 slots in 1202 for an SCS of 960 kHz with the PDCCH information in the first two symbols of each slot. In one embodiment, X is configured (e.g., configured by the gNB). In another embodiment, X is SCS dependent. In one embodiment, for an SCS of 240 kHz, X is 3, for an SCS of 480 kHz, X is 6, and for an SCS of 960 kHz, X is 12. In another embodiment, for each slot in the slot group, PDCCH monitoring occurs on any span of X consecutive symbols within the slot, where X is an integer. An example of this is shown in FIG. 12 in OFDM symbols

1203 where the information in OFDM symbols 1201 is aggregated into the 8 slots for an SCS of 960 kHz, where with the PDCCH information is in the two symbols in each of the slots but at different locations in two or more slots. In one embodiment, X is configured (e.g., configured by the gNB). In another embodiment, X is SCS dependent. In one embodiment, for an SCS of 240 kHz, X is 3, for an SCS of 480 kHz, X is 6, and for an SCS of 960 kHz, X is 12.

In some embodiments in which the information specifies the location of the PDCCH MOs, the PDCCH monitoring occasions are defined per slot group. In this case, in one embodiment, for each slot in the slot group, PDCCH monitoring occurs within the first X symbols, where X is an integer. An example of this is shown in FIG. 12 in OFDM symbols OFDM symbols 1204 where the information in OFDM symbols 1201 is aggregated into the 8 slots for an SCS of 960 kHz and the PDCCH information is at the beginning of the first slot. In one embodiment, X is configured (e.g., configured by the gNB). In another embodiment, X is SCS dependent. In one embodiment, for an SCS of 240 kHz, X is 3, for an SCS of 480 kHz, X is 6, and for an SCS of 960 kHz, X is 12. In another embodiment, for each slot in the slot group, PDCCH monitoring occurs on any span of X consecutive symbols within the slot, where X is an integer. An example of this is shown in FIG. 12 in OFDM symbols 1205 where the information in OFDM symbols 1201 is aggregated into the 8 slots for an SCS of 960 kHz, and the PDCCH information occurs in the third slot. In one embodiment, X is configured (e.g., configured by the gNB). In another embodiment, X is SCS dependent. In one embodiment, for an SCS of 240 kHz, X is 3, for an SCS of 480 kHz, X is 6, and for an SCS of 960 kHz, X is 12.

In one embodiment, the PDCCH monitoring can be causal or non-causal. When causal, the PDCCH MOs apply only to symbols either at the same time or in the future. When non-causal, the PDCCH MOs can apply to any symbol starting from the beginning of the PDCCH slot group.

In one embodiment, when the UE has the monitoring limits spread over a slot group and its reaches its limit and overbooking occurs, the UE applies one or more algorithms to perform dropping. In one embodiment, the overbooking and dropping are performed per slot group. In another embodiment, overbooking and dropping are performed per slot within the slot group. In such a case, the overbooking and dropping may be done per slot within the slot group based on a limit per slot.

Optionally, in one embodiment, the UE is configured so that there is a minimum interval between PDCCH MOs within the slot group. In one embodiment, the minimum interval at least one in each slot. Note that other minimum intervals may be used.

Optionally, in one embodiment, the UE is configured to perform PDCCH monitoring based on there being a uniform distribution of PDCCH MOs in the slots of the slot group. In another embodiment, the UE is configured to perform PDCCH monitoring based on there being a non-uniform distribution of PDCCH MOs in the slots of the slot group.

In one embodiment, the slot group is configurable. In one embodiment, the configuration of the slot group is semi-static. In one embodiment, this is controlled by the gNB, or another network node. In one embodiment, with the slot groups having a semi-static slot group configuration, the number of slots in the slot group, the distribution of MO within each slot group and/or the limits on each slot group are communicated to the UE in a semi-static manner. For example, in one embodiment, such information may be communicated by RRC configuration.

Figure 13:
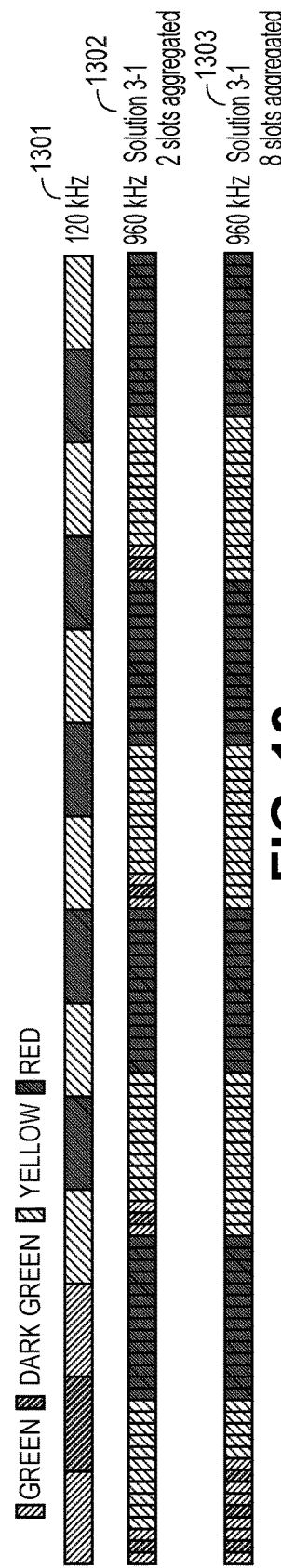
FIG. 13 is an example of static aggregation.

In one embodiment, with the semi-static slot group configuration, the number of slots scheduled for each monitoring opportunity is semi-static. In one embodiment, the scheduling for multiple aggregated slots is performed by a scheduling unit. FIG. 13 is an example of static aggregation. Referring to FIG. 13, OFDM symbols 1301 illustrates one slot at 120 kHz where the PDCCH information appears in the first 24 symbols of the slot, OFDM symbols 1302 illustrates 8 slots at 960 kHz where the information is aggregated over two slots, and OFDM symbols 1303 illustrates 8 slots at 960 kHz where the information is aggregated over seven slots. OFDM symbols 1301 represents a reference. OFDM symbols 1302 illustrates a result of performing semi-static aggregation with respect to OFDM symbols 1301, which results in 3 symbols per slot group at the beginning of the slot group (X equals 3), where the slot group is the size of 2 slots. OFDM symbols 1303 illustrates a result of performing semi-static aggregation with respect to OFDM symbols 1301, which results in 9 symbols per slot group at the beginning of the slot group (X equals 9), where the slot group is the size of 8 slots.

In one embodiment with the slot groups having a semi-static slot group configuration, the slot groups are non-overlapping and adjacent to each other. In another embodiment, with the slot groups having a semi-static slot group configuration, the slot groups are non-overlapping and may not be adjacent to each other. This may allow power savings in the times when no valid slot groups are defined. In yet another embodiment of the slot groups having semi-static slot group configuration, the slot groups may be overlapping.

In one embodiment, the semi-static configuration allows for different slot groups sizes to be configured simultaneously. For example, at time t1, the slot group size is 8 while at time t2, the slot group size is 16. In one embodiment, the slot group configuration is tied to the subcarrier spacing (SCS).

In one embodiment, the configuration of the slot group is dynamic. In one embodiment, this is controlled by the gNB, or another network node. In one embodiment with the slot groups having a dynamic slot group configuration, the number of slots in the slot group, the distribution of MO within each slot group and/or the limits on each slot group are communicated to the UE dynamically. In one embodiment, this information is communicated through L-1 signaling. However, in alternative embodiments, the information may be communication using another type of signaling or an alternative communication mechanism. In one embodiment, the UE is configured with multiple slot-group configurations and L-1 signaling is used to dynamically switch between slot-group configurations, thereby allowing a change in the slot group size dynamically over time.

Figure 14:
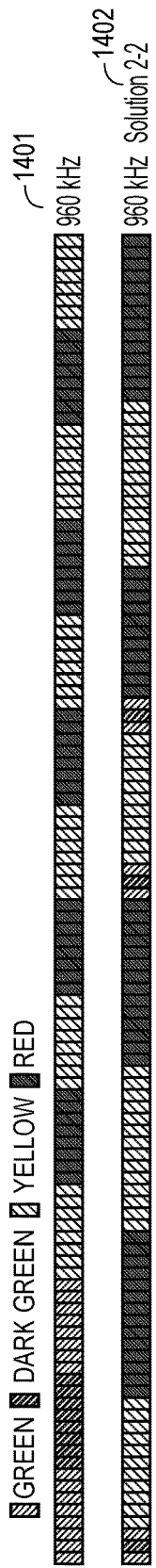
FIG. 14 is an example of dynamic aggregation.

In one embodiment, with the dynamic slot group configuration, the number of slots scheduled for each monitoring opportunity is dynamic. In one embodiment, the scheduling for multiple aggregated slots is performed by a scheduling unit. FIG. 14 is an example of dynamic aggregation. Referring to FIG. 14, OFDM symbols 1401 illustrates one slot at 120 kHz where the PDCCH information appears in the first 24 symbols of the slot, and represents a reference. OFDM symbols 1402 illustrates slots at 960 kHz being aggregated where 4 slots are aggregated, then 1 slot is aggregated and then 3 slots are aggregated.

In one embodiment of the slot groups with the slot groups having a dynamic slot group configuration, the slot groups are non-overlapping and adjacent to each other. In another embodiment with the slot groups having a dynamic slot group configuration, the slot groups are non-overlapping and may not be adjacent to each other. This may allow power savings in the times when no valid slot groups are defined. In yet another embodiment of the slot groups having semi-static slot group configuration, the slot groups may be overlapping.

In one embodiment the configuration of the slot group is signaled to the UE. In one embodiment, the DCI signaling is used to signal the slot group configuration. For example, in one embodiment, in slot group N-1, DCI signaling is used to indicate the slot group configuration for slot group N. In one embodiment, the signaling is UE-specific signaling. For example, the UE-specific signaling is signaled in a GC-PDCCH. In one embodiment, the UE-specific signaling is sent in a UE-specific DCI.

In one embodiment, the UE receives configuration information and is configured to perform PDCCH monitoring on a PDCCH MO that may be set to occur on any OFDM symbols in a slot Group with a gap. This enables any symbols within the slot group to contain a PDCCH MO (as opposed to the first X symbols or any X consecutive symbols as discussed above). In one embodiment, the location of these MOs are based on the symbols corresponding to beam pairs.

Figure 15:
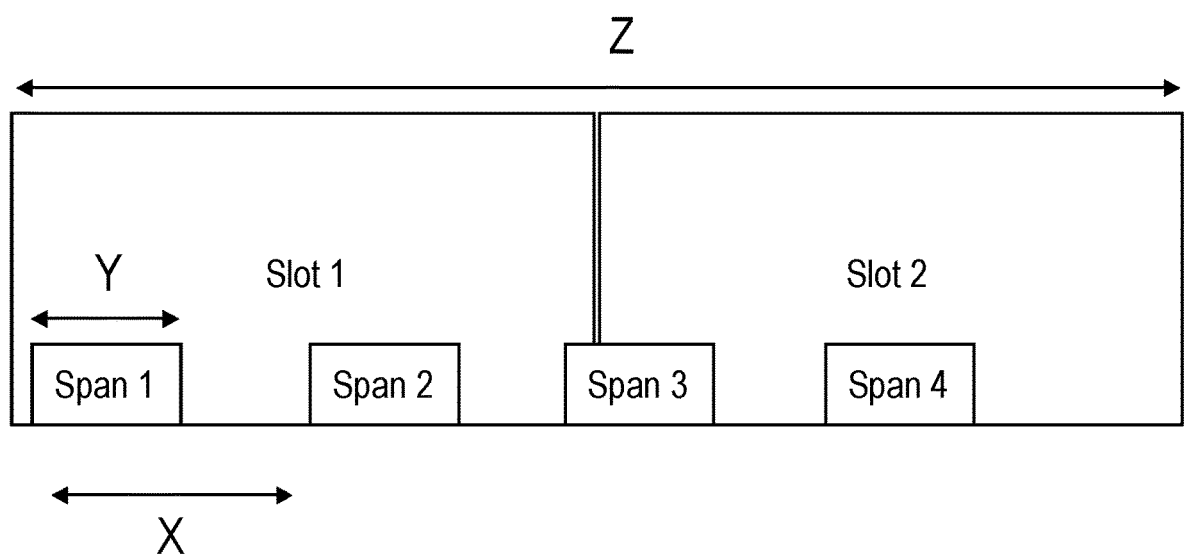
FIG. 15 illustrates of locations of the MOs within a span.

In one embodiment, all PDCCH monitoring occasions can be located in any OFDM symbol of a slot-group with a minimum time separation between a predetermined number (e.g., 2) consecutive transmissions of the PDCCH. FIG. 15 illustrates of locations of the MOs within a span. Referring to FIG. 15, X is minimum number of OFDM symbols between the start of different PDCCH MO, Y is a number of OFDM symbols within which the monitoring occasion occurs, and Z is a slot group size. In one embodiment, the signaling of the locations of the PDCCH is fixed (configured). In one embodiment, the signaling of the locations of the PDCCH is signaled by L1. However, alternative signaling may be used.

In one embodiment, X and Y are based on the actual symbols of the slot/slot-group. In another embodiment, X and Y are based on symbols that are transmitted with beams that allow communication to the UE. For example, X refers to the X symbols that are transmitted/received with a specific beam pair and Y refers to interval based on actual beam pairs.

Unlike the PDCCH monitoring described above where (X, Y) is one of a set of (2,2), (4,3) or (7,3), in one embodiment X, Y and Z are SCS and slot group size dependent.

In one embodiment, there is a minimum interval between PDCCH MOs within the slot group. For example, in one embodiment, there is a minimum of at least 1 MO in each slot. Note that the distribution of PDCCH MOs may be uniform or non-uniform.

Figure 16:
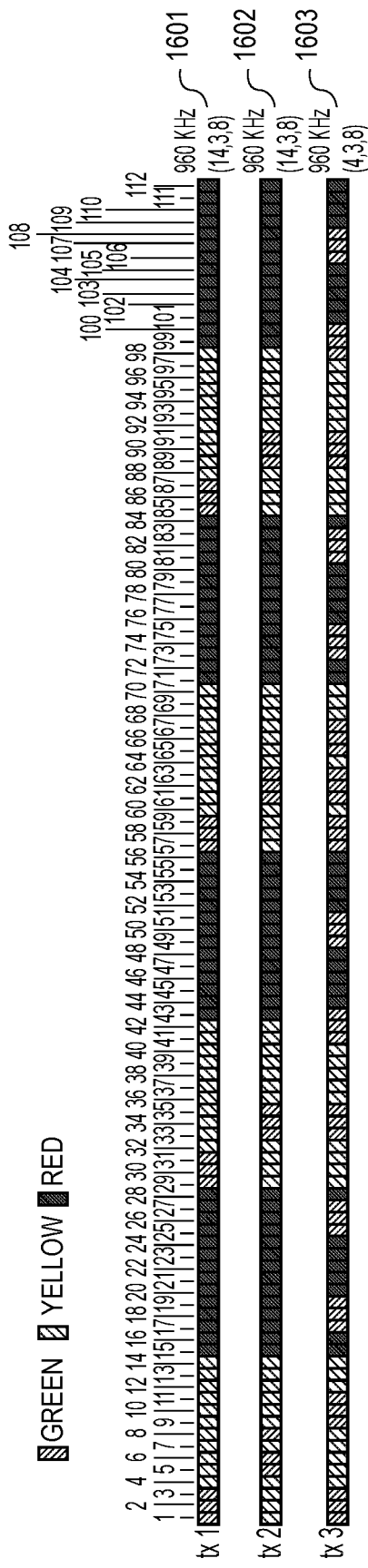
FIG. 16 illustrates three examples of locations of the MOs.

FIG. 16 illustrates three examples of locations of the MOs. Each of the examples are for an SCS of 960 kHz. Referring to FIG. 16, OFDM symbols 1601 illustrates an example where X equals 14, Y equals 3, Z equals 8 and the offset equals zero, OFDM symbols 1602 illustrates an example where X equals 14, Y equals 3, Z equals 8 and the offset equals 5, and OFDM symbols 1603 illustrates an example where X equals 8, Y equals 3, Z equals 8 and the offset equals zero. Note that these examples are not meant to limit the techniques described herein to these specific values of X, Y, Z and the offset.

Figure 17:
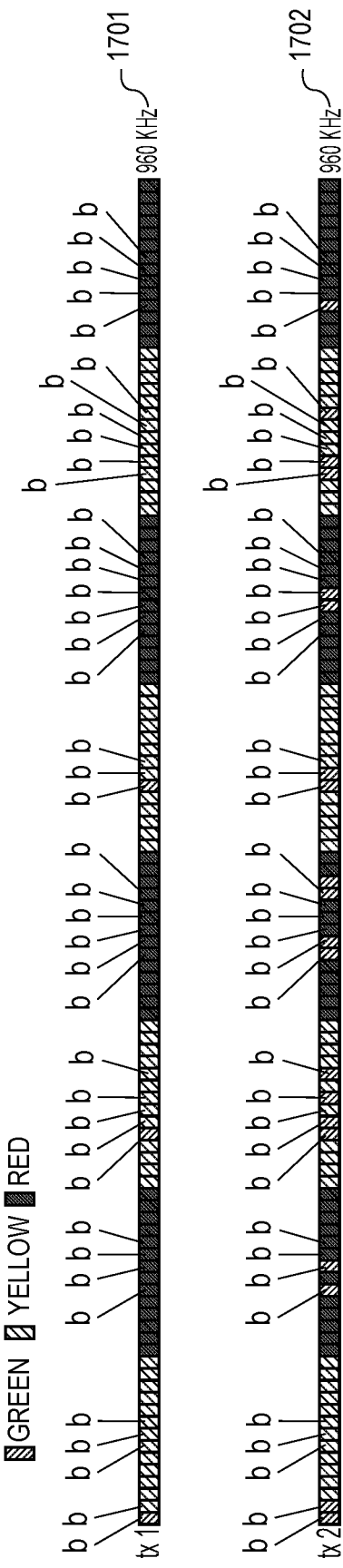
FIG. 17 illustrates examples of locations of the MOs based on symbols that are transmitted with beams that allow communication to the UE.

FIG. 17 illustrates examples of locations of the MOs based on symbols that are transmitted with beams that allow communication to the UE. Referring to FIG. 17, OFDM symbols 1701 illustrates an example where X equals 2, Y equals 1, Z is not applicable (N/A) and the offset is N/A and the first valid beam in each slot group is used as a location for PDCCH information, and OFDM symbols 1702 illustrates an example where X equals 3, Y equals 2, Z equals 2 and the offset equals 0 and the next symbols used for a location for PDCCH information among all the subsequent symbols is 3 symbols (with valid beams) away from the previous span, the span length is 2 and the slot group length is 2. Note that these examples are not meant to limit the techniques described herein to these specific values of X, Y, Z and the offset.

The configurations described above may be used in conjunction with having locations of the MOs based on symbols that are transmitted with beams that allow communication to the UE. In one embodiment, the UE is configured to perform PDCCH monitoring on up to X (e.g., 3) symbols at beginning of a scheduling unit that are transmitted with beams that allow communication to the UE, where the scheduling unit size is variable (e.g., 8 slots). In another embodiment, the UE is configured to perform PDCCH monitoring on up to three symbols at beginning of a scheduling unit, where the scheduling unit size is based on locations of symbols transmitted with beams that allow communication to the UE. In yet another embodiment, the UE is configured to perform PDCCH monitoring on up to three symbols at beginning of a scheduling unit that are transmitted with beams that allow communication to the UE, where the scheduling unit size is based on locations of symbols transmitted with beams that allow communication to the UE.

In one embodiment, the UE is configured to perform PDCCH monitoring on any span of up to three symbols within a scheduling unit that are transmitted with beams that allow communication to the UE, where the scheduling unit size is variable (e.g., 8 slots). In another embodiment, the UE is configured to perform PDCCH monitoring on any span of up to three symbols within a scheduling unit, where the scheduling unit size is based on locations of symbols transmitted with beams that allow communication to the UE. In yet another embodiment, the UE is configured to perform PDCCH monitoring on any span of up to three symbols within a scheduling unit that are transmitted with beams that allow communication to the UE, where the scheduling unit size is based on locations of symbols transmitted with beams that allow communication to the UE.

Exemplary Flow Diagrams

FIG. 18 is a flow diagram of one embodiment of a process for configuring a UE. The process is performed by processing logic that comprises hardware (circuitry, dedicated logic, etc.), software (e.g., software running on a chip, software run on a general-purpose computer system or a dedicated machine, etc.), firmware, or a combination of the three. In one embodiment, the operations in the process are performed by a UE in a 5G NR communication system.

Referring to FIG. 18, the process begins by processing logic receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, and wherein monitoring limits associated with each of the SCSs including a number of blind decodes (BD) and a number of CCEs per component carrier (CC) are applied per slot per CC and UE decode complexity associated with performing the monitoring limits for the different SCSs in the group is equal (processing block 1801). In one embodiment, the monitoring limits are scaled versions of each other and increase based on reduction in symbol size.

In one embodiment, the monitoring limits are scaled versions of each other and increase based on reduction in symbol size. In one embodiment, the BD and CCE limits associated with each increase in SCS differ by an integer scaling factor, wherein the integer is 2 or greater. In another embodiment, the BD and CCE limits associated with each increase in SCS differ by a non-linear relationship.

In one embodiment, the PDCCH search space monitoring is specified to occur over a span of X symbols, where X is an integer.

In response to receiving the monitoring configuration information, processing logic configures the UE to perform monitoring of each search space according to the monitoring configuration information, including PDCCH search space monitoring as specified in the monitoring configuration information (processing block 1802).

While performing the PDCCH search space monitoring, processing logic may optionally perform dropping of one or both candidates that require blind decoding or candidates that require channel estimations in response to exceeding the monitoring limits (processing block 1803).

FIG. 19 is a flow diagram of another embodiment of a process for configuring a UE. The process is performed by processing logic that comprises hardware (circuitry, dedicated logic, etc.), software (e.g., software running on a chip, software run on a general-purpose computer system or a dedicated machine, etc.), firmware, or a combination of the three. In one embodiment, the operations in the process are performed by a UE in a 5G NR communication system.

Referring to FIG. 19, the process begins by processing logic receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, and wherein monitoring limits are associated with each of the SCSs including a number of blind decodes (BD) and a number of CCEs per component carrier (CC) for a slot group of a plurality of slots and for application over a duration of the slot group (processing block 1901).

In one embodiment, the monitoring limits are defined per slot group per CC. In one embodiment, the monitoring limits are set based on limits of a reference SCS.

In one embodiment, the monitoring configuration information specifies PDCCH monitoring occasions (MOs) per slot with the slot group. In one embodiment, PDCCH monitoring occurs with the first X symbols for each slot in the slot group, where X is an integer. In another embodiment, PDCCH monitoring occurs with a span of X consecutive symbols for each slot in the slot group, where X is an integer.

In one embodiment, the monitoring configuration information specifies PDCCH MOs per the slot group. In one embodiment, PDCCH monitoring occurs with the first X symbols for each slot in the slot group, where X is an integer. In another embodiment, PDCCH monitoring occurs with a span of X consecutive symbols for each slot in the slot group, where X is an integer.

In one embodiment, PDCCH monitoring is causal in that PDCCH MOs apply only to symbols either at a same time or a future time. In another embodiment, PDCCH monitoring is non-causal in that PDCCH MOs apply to any symbol starting from a beginning of the slot group.

In one embodiment, the monitoring configuration information specifies PDCCH MOs with a minimum interval between consecutive MOs. In one embodiment, the monitoring configuration information specifies PDCCH MOs with uniform or non-uniform distribution. In one embodiment, the monitoring configuration information comprises a number of slots in the slot group, a MO distribution within each slot group and the monitoring limits of each slot group and the monitoring configuration information is communicated in a semi-static manner from a network node. In one embodiment, the monitoring configuration information comprises a number of slots in the slot group, a MO distribution within each slot group and the monitoring limits of each slot group and the monitoring configuration information is communicated dynamically from a network node. In one embodiment, at least a portion of the monitoring configuration information is communicated using Layer 1 (L-1) signaling.

In one embodiment, the monitoring configuration information comprises DCI signaling in the slot group that indicates a slot group configuration from a next slot group that immediately follows the slot group.

In one embodiment, the slot group is independent of scheduling user data transmission for the wireless device during slots in the slot group or across slot groups.

In one embodiment, the monitoring configuration information specifies a location of PDCCH MOs based on a minimum number of symbols between a start of different ones of the PDCCH MOs, a number of symbols within which a MO occurs, and a slot group size.

In one embodiment, one or both of the minimum number of symbols between a start of different ones of the PDCCH MOs and the number of symbols within which a MO occurs are based on symbols of the slot group or a slot within the slot group. In one embodiment, one or both of the minimum number of symbols between a start of different ones of the PDCCH MOs and the number of symbols within which a MO occurs are based on symbols transmitted with beams used for communication with the UE. In on embodiment, the minimum number of symbols between a start of different ones of the PDCCH MOs is equal to a number of symbols that are transmitted and/or received with a specific beam pair and the number of symbols within which a MO occurs is based on actual beam pairs.

In response to receiving the monitoring configuration information, processing logic configures the UE to perform monitoring of each search space according to the monitoring configuration information, including PDCCH search space monitoring as specified in the monitoring configuration information (processing block 1902).

While performing the PDCCH search space monitoring, processing logic may optionally perform dropping of one or both candidates that require blind decoding or candidates that require channel estimations in response to exceeding the monitoring limits (processing block 1903).

FIG. 20 is a flow diagram of one embodiment of a process by which network equipment configures a UE. The process is performed by processing logic that comprises hardware (circuitry, dedicated logic, etc.), software (e.g., software running on a chip, software run on a general-purpose computer system or a dedicated machine, etc.), firmware, or a combination of the three. In one embodiment, the operations in the process are performed by network equipment operating in a 5G new radio a spectrum in 5G new radio (NR) above 52.6 GHz.

Referring to FIG. 20, the process begins by processing logic determining a physical downlink control channel (PDCCH) search space monitoring configuration for a wireless device, wherein the PDCCH search space monitoring configuration specifies PDCCH monitoring for one subcarrier spacing (SCS) selected from a group of subcarrier spacings (SCSs) that are related to a spectrum in 5G new radio (NR) above 52.6 GHz, and wherein monitoring limits associated with each of the SCSs including a number of blind decodes (BD) and a number of CCEs per component carrier (CC) are applied per slot per CC and UE decode complexity associated with performing the monitoring limits for the different SCSs in the group is equal (processing block 2001). In one embodiment, the monitoring limits are scaled versions of each other and increase based on reduction in symbol size.

In one embodiment, the monitoring limits are scaled versions of each other and increase based on reduction in symbol size. In one embodiment, the BD and CCE limits associated with each increase in SCS differ by an integer scaling factor, wherein the integer is 2 or greater. In another embodiment, the BD and CCE limits associated with each increase in SCS differ by a non-linear relationship.

In one embodiment, the PDCCH search space monitoring is specified to occur over a span of X symbols, where X is an integer.

After determining the PDCCH search space monitoring configuration for the wireless device, processing logic transmits monitoring configuration information identifying the monitoring configuration to the wireless device (processing block 2002).

FIG. 21 is a flow diagram of another embodiment of a process by which network equipment configures a UE. The process is performed by processing logic that comprises hardware (circuitry, dedicated logic, etc.), software (e.g., software running on a chip, software run on a general-purpose computer system or a dedicated machine, etc.), firmware, or a combination of the three. In one embodiment, the operations in the process are performed by network equipment operating in a 5G new radio a spectrum in 5G new radio (NR) above 52.6 GHz.

Referring to FIG. 21, the process begins by processing logic determining a physical downlink control channel (PDCCH) search space monitoring configuration for a wireless device, wherein the PDCCH search space monitoring configuration specifies PDCCH monitoring for one subcarrier spacing (SCS) selected from a group of subcarrier spacings (SCSs) that are related to a spectrum in 5G new radio (NR) above 52.6 GHZ, and wherein monitoring limits are associated with each of the SCSs including a number of blind decodes (BD) and a number of CCEs per component carrier (CC) for a slot group of a plurality of slots and for application over a duration of the slot group (processing block 2101).

In one embodiment, the monitoring limits are defined per slot group per CC. In one embodiment, the monitoring limits are set based on limits of a reference SCS.

In one embodiment, the monitoring configuration information specifies PDCCH monitoring occasions (MOs) per slot with the slot group. In one embodiment, PDCCH monitoring occurs with the first X symbols for each slot in the slot group, where X is an integer. In another embodiment, PDCCH monitoring occurs with a span of X consecutive symbols for each slot in the slot group, where X is an integer.

In one embodiment, the monitoring configuration information specifies PDCCH MOs per the slot group. In one embodiment, PDCCH monitoring occurs with the first X symbols for each slot in the slot group, where X is an integer.

In another embodiment, PDCCH monitoring occurs with a span of X consecutive symbols for each slot in the slot group, where X is an integer.

In one embodiment, PDCCH monitoring is causal in that PDCCH MOs apply only to symbols either at a same time or a future time. In another embodiment, PDCCH monitoring is non-causal in that PDCCH MOs apply to any symbol starting from a beginning of the slot group.

In one embodiment, the monitoring configuration information specifies PDCCH MOs with a minimum interval between consecutive MOs. In one embodiment, the monitoring configuration information specifies PDCCH MOs with uniform or non-uniform distribution. In one embodiment, the monitoring configuration information comprises a number of slots in the slot group, a MO distribution within each slot group and the monitoring limits of each slot group and the monitoring configuration information is communicated in a semi-static manner from a network node. In one embodiment, the monitoring configuration information comprises a number of slots in the slot group, a MO distribution within each slot group and the monitoring limits of each slot group and the monitoring configuration information is communicated dynamically from a network node. In one embodiment, at least a portion of the monitoring configuration information is communicated using Layer 1 (L-1) signaling.

In one embodiment, the monitoring configuration information comprises DCI signaling in the slot group that indicates a slot group configuration from a next slot group that immediately follows the slot group.

In one embodiment, the slot group is independent of scheduling user data transmission for the wireless device during slots in the slot group or across slot groups.

In one embodiment, the monitoring configuration information specifies a location of PDCCH MOs based on a minimum number of symbols between a start of different ones of the PDCCH MOs, a number of symbols within which a MO occurs, and a slot group size.

In one embodiment, one or both of the minimum number of symbols between a start of different ones of the PDCCH MOs and the number of symbols within which a MO occurs are based on symbols of the slot group or a slot within the slot group. In one embodiment, one or both of the minimum number of symbols between a start of different ones of the PDCCH MOs and the number of symbols within which a MO occurs are based on symbols transmitted with beams used for communication with the UE. In on embodiment, the minimum number of symbols between a start of different ones of the PDCCH MOs is equal to a number of symbols that are transmitted and/or received with a specific beam pair and the number of symbols within which a MO occurs is based on actual beam pairs.

After determining the PDCCH search space monitoring configuration for the wireless device, processing logic transmits monitoring configuration information identifying the monitoring configuration to the wireless device (processing block 2102).

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMS, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated from throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method performed by a user equipment (UE) comprising:
receiving monitoring configuration information, wherein the monitoring configuration information specifying PDCCH search space monitoring to be performed specifies PDCCH monitoring for one subcarrier spacing (SCS) selected from a group of different subcarrier spacings (SCSs) that are related to a spectrum in 5G new radio (NR) above 52.6 GHz, wherein monitoring limits associated with each of the SCSs above 120 kHz, including a number of blind decodes (BD) and a number of CCEs per component carrier (CC), are applied per slot per CC, the monitoring limits are scaled versions of each other and increase based on reduction in symbol size, and a monitoring limit is a per-CC limit on a maximum number of non-overlapping CCEs per monitoring span; and
monitoring each search space according to the monitoring configuration information.

2. The method of claim 1 wherein UE decode complexity associated with performing the monitoring limits for the different SCSs in the group is equal.

3. The method of claim 1 wherein the monitoring limits including the number of BDs and the number of CCEs associated with each increase in SCS differ by an integer scaling factor, wherein the integer scaling factor is 2 or greater.

4. The method of claim 1 wherein the monitoring limits including the number of BDs and the number of CCEs associated with each increase in SCS differ according to a non-linear relationship.

5. The method of claim 1 wherein the PDCCH search space monitoring is specified to occur over a span of X symbols, where X is an integer.

6. A UE comprising one or more processors configured to perform operations comprising:
processing monitoring configuration information received from a network node, wherein the monitoring configuration information specifying PDCCH search space monitoring to be performed specifies PDCCH monitoring for one subcarrier spacing (SCS) selected from a group of different subcarrier spacings (SCSs) that are related to a spectrum in 5G new radio (NR) above 52.6 GHz, wherein monitoring limits associated with each of the SCSs above 120 kHz including a number of blind decodes (BD) and a number of CCEs per component carrier (CC) are applied per slot per CC, the monitoring limits are scaled versions of each other and increase based on reduction in symbol size, and a monitoring limit is a per-CC limit on a maximum number of non-overlapping CCEs per monitoring span; and
monitoring each search space according to the monitoring configuration information.

7. The UE of claim 6 wherein the monitoring limits including the number of BDs and the number of CCEs associated with each increase in SCS differ by an integer scaling factor, wherein the integer scaling factor is 2 or greater, or via a non-linear relationship.

8. A method performed by a UE comprising:
receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, wherein monitoring limits are associated with each of the SCSs above 120 kHz including a number of blind decodes (BD) and a number of CCEs per component carrier (CC) for a slot group of a plurality of slots, the monitoring limits are scaled versions of each other and increase based on reduction in symbol size, and the monitoring limits are for application over a duration of the slot group;
and monitoring each search space according to the monitoring configuration information.

9. The method of claim 8 wherein the monitoring limits are defined per slot group per CC.

10. The method of claim 8 wherein the monitoring configuration information specifies PDCCH monitoring occasions (MOs) per slot with the slot group.

11. The method of claim 8 wherein the monitoring configuration information specifies PDCCH MOs per the slot group.

12. The method of claim 8 further comprising performing dropping one or both candidates that require blind decoding or candidates that require channel estimations in response to exceeding the monitoring limits.

13. The method of claim 8 wherein the monitoring configuration information specifies PDCCH MOs with a minimum interval between consecutive MOs.

14. The method of claim 8 wherein the monitoring configuration information specifies PDCCH MOs with uniform or non-uniform distribution.

15. The method of claim 8 wherein the monitoring configuration information comprises a number of slots in the slot group, a MO distribution within each slot group and the monitoring limits of each slot group and the monitoring configuration information is communicated in a semi-static manner from a network node.

16. The method of claim 8 wherein the monitoring configuration information comprises a number of slots in the slot group, a MO distribution within each slot group and the monitoring limits of each slot group and the monitoring configuration information is communicated dynamically from a network node.

17. The method of claim 8 wherein the slot group is independent of scheduling user data transmission for a wireless device during slots in the slot group or across slot groups.

18. Baseband circuitry comprising one or more processors configured to perform operations comprising:
receiving monitoring configuration information, wherein the monitoring configuration information specifying PDCCH search space monitoring to be performed specifies PDCCH monitoring for one subcarrier spacing (SCS) selected from a group of subcarrier spacings (SCSs) that are related to a spectrum in 5G new radio (NR) above 52.6 GHz, wherein monitoring limits are associated with each of the SCSs above 120 kHz including a number of blind decodes (BD) and a number of CCEs per component carrier (CC) for a slot group of a plurality of slots, and the monitoring limits are scaled versions of each other and increase based on reduction in symbol size, the monitoring limits are for application over a duration of the slot group, and a monitoring limit is a per-CC limit on a maximum number of non-overlapping CCEs per monitoring span; and
monitoring each search space according to the monitoring configuration information.

* * * * *